United States Patent [19]
Asada et al.

[11] Patent Number: 5,718,155
[45] Date of Patent: Feb. 17, 1998

[54] SLEEVE BORE MACHINING APPARATUS AND SLEEVE BORE MACHINING METHOD

[75] Inventors: Takafumi Asada, Hirakata; Masato Morimoto, Neyagawa, both of Japan

[73] Assignee: Matsushita Electric Industrial Co., Ltd., Osaka-fu, Japan

[21] Appl. No.: 679,447

[22] Filed: Jul. 12, 1996

[30]  Foreign Application Priority Data

Jul. 14, 1995  [JP]  Japan ................... 7-178522

[51] Int. Cl.$^6$ ............... B23B 3/00; B23B 41/00
[52] U.S. Cl. ............... 82/1.11; 82/1.2; 73/862.14
[58] Field of Search ................ 82/1.11, 1.2; 408/2, 408/1 R; 73/862.14; 451/51

[56]  References Cited

U.S. PATENT DOCUMENTS 4,704,825  11/1987  Moore .................................. 451/51
4,980,996  1/1991  Klink et al. .......................... 451/51

FOREIGN PATENT DOCUMENTS 7-164086  6/1995  Japan .

Primary Examiner—Steven C. Bishop
Assistant Examiner—Mark Williams
Attorney, Agent, or Firm—Wenderoth, Lind & Ponack

[57]  ABSTRACT

A sleeve bore machining apparatus has a plurality of reamers with different diameters, wherein a ball etc. is pressed in and passed through the sleeve bore after a machining with the reamer inserted in the sleeve, measures the push-in load involved in the pass-through operation to select a diameter of the reamer to be used for the next machining process in response to a magnitude of the measured load, or carries out a machining process while a reamer having an edged taper portion or taper stepped portions in a grinding portion is kept inserted in the bore of the sleeve, and controls an extent of insertion of the reamer for the next machining process in response to a magnitude of the measured load, so that the dimensional accuracy of the bore as well as the cylindricity can be successfully machined.

8 Claims, 14 Drawing Sheets

SLEEVE BORE MACHINING APPARATUS AND SLEEVE BORE MACHINING METHOD

BACKGROUND OF THE INVENTION

The present invention relates to a sleeve bore machining apparatus, as well as a sleeve bore machining method, optimized for machining with high accuracy the bore of sleeves to be used in precision sliding bearings, dynamic-pressure type fluid bearings, and the like.

Referring to the accompanying drawings, an example of the sleeve bore machining apparatus and sleeve bore machining method according to the prior art is described below. FIG. 19 is a sectional view of the conventional sleeve bore machining apparatus, and FIG. 20 is a machining process chart of the apparatus. Referring to FIG. 19, a work spindle 219, to which a chuck 218 is fitted, rotates while gripping a sleeve (workpiece) 201. A stage 221 is slidable and has a reamer 220 fixed thereto.

The operation of the conventional sleeve bore machining apparatus and sleeve bore machining method with the above constitution is explained below. While the stage 221 moves in sliding contact with the rotating sleeve 201 as shown in FIGS. 19 to 20, the reamer 220 machines a bore 201A of the sleeve 201. Then, the machining is ended.

However, the above constitution has the following issues. That is, the diameter size of the machined bore 1A has considerable dispersions of around ±5 μm, and yet the cylindricity is as poor as 3 to 5 μm such that the machining often results in a taper shape. The resulting sleeves, if used in bearings or the like, would show poor performance.

SUMMARY OF THE INVENTION

An object of the present invention is to provide a sleeve bore machining apparatus and method capable of processing a bore of a sleeve at high accuracy without any dispersions.

In accomplishing these and other aspects, according to a first aspect of the present invention, there is provided a sleeve bore machining apparatus comprising:

a sleeve holding member for holding a sleeve which is to be machined;

a plurality of reamers positioned on an axis coaxial with or parallel to an axis of the sleeve held by the sleeve holding member;

a drive member for rotating at least one of one of the plurality of reamers and the sleeve holding member to machine the bore of the sleeve by the reamer;

a moving member for relatively moving at least one of one of the plurality of reamers and the sleeve holding member in a direction of the axis of the sleeve and a direction perpendicular to the direction of the axis;

a measurement element supplying member for supplying a measurement element into the bore of the sleeve;

a pusher for pushing the measurement element into the bore;

a load cell for measuring a push-in load due to the pusher; and a calculation unit for performing calculation to select a reamer from among the plurality of reamers, in response to a magnitude of the push-in load.

According to a second aspect of the present invention, there is provided a sleeve bore machining apparatus comprising:

a sleeve holding member for holding a sleeve which is to be machined;

an edged-taper-shaped or generally taper-shaped reamer positioned on an axis coaxial with or parallel to an axis of the sleeve held by the sleeve holding member;

a drive member for rotating at least one of the reamer and the sleeve holding member to machine the bore of the sleeve by the reamer;

a moving member for relatively moving at least one of the reamer and the sleeve holding member in a direction of the axis of the sleeve and a direction perpendicular to the direction of the axis;

a measurement element supplying member for supplying a measurement element into the bore of the sleeve;

a pusher for pushing the measurement element into the bore;

a load cell for measuring a push-in load due to the pusher; and a calculation unit for performing calculation to determine an extent of pushing in the edged-taper-shaped reamer into the sleeve, in response to a magnitude of the push-in load.

According to a third aspect of the present invention, there is provided the sleeve bore machining apparatus according to the first aspect of the present invention, wherein the plurality of reamers each have, as part of edge surface thereof, an edged taper shape or a generally taper shape, and the calculation unit selects a reamer from amount the plurality of reamers and determine an extent of pushing in the selected reamer into the sleeve, in response to the magnitude of the push-in load.

According to a fourth aspect of the present invention, there is provided a sleeve bore machining method comprising steps of:

relatively rotating a sleeve which is to be machined and one of a plurality of reamers to machine a bore of the sleeve;

after machining the bore, supplying a measurement element for measuring an inner diameter of the bore into the bore of the sleeve under pressure;

measuring a push-in load caused by the measurement element at the measurement element supplying step; and selecting a reamer to be used, from among the plurality of reamers, in response to a magnitude of the push-in load.

According to a fifth aspect of the present invention, there is provided a sleeve bore machining method comprising steps of:

relatively rotating a sleeve which is to be machined and one of a reamer having an edged taper shape or a generally taper shape to machine a bore of the sleeve;

after machining the bore, supplying a measurement element for measuring an inner diameter of the bore into the bore of the sleeve under pressure;

measuring a push-in load caused by the measurement element at the measurement element supplying step; and determining an extent of pushing in the edged-taper-shaped reamer into the sleeve, in response to a magnitude of the push-in load.

According to a sixth aspect of the present invention, there is provided the method according to the fourth aspect of the present invention, wherein the plurality of reamers each have, as part of edge surface thereof, an edged taper shape or a generally taper shape, and in the selecting step, in response to the magnitude of the push-in load, a reamer to be used is selected from among the plurality of reamers and an extent of pushing in the selected reamer into the sleeve is determined.

With the above constitution, the present invention allows the sleeve bore to be finished with less dispersion in its diameter size and with high accuracy.

BRIEF DESCRIPTION OF THE DRAWINGS

These and other aspects and features of the present invention will become clear from the following description taken in conjunction with the preferred embodiments thereof with difference to the accompanying drawings, in which.

DETAILED DESCRIPTION OF THE PREFERRED EMBODIMENTS

Figure 1:
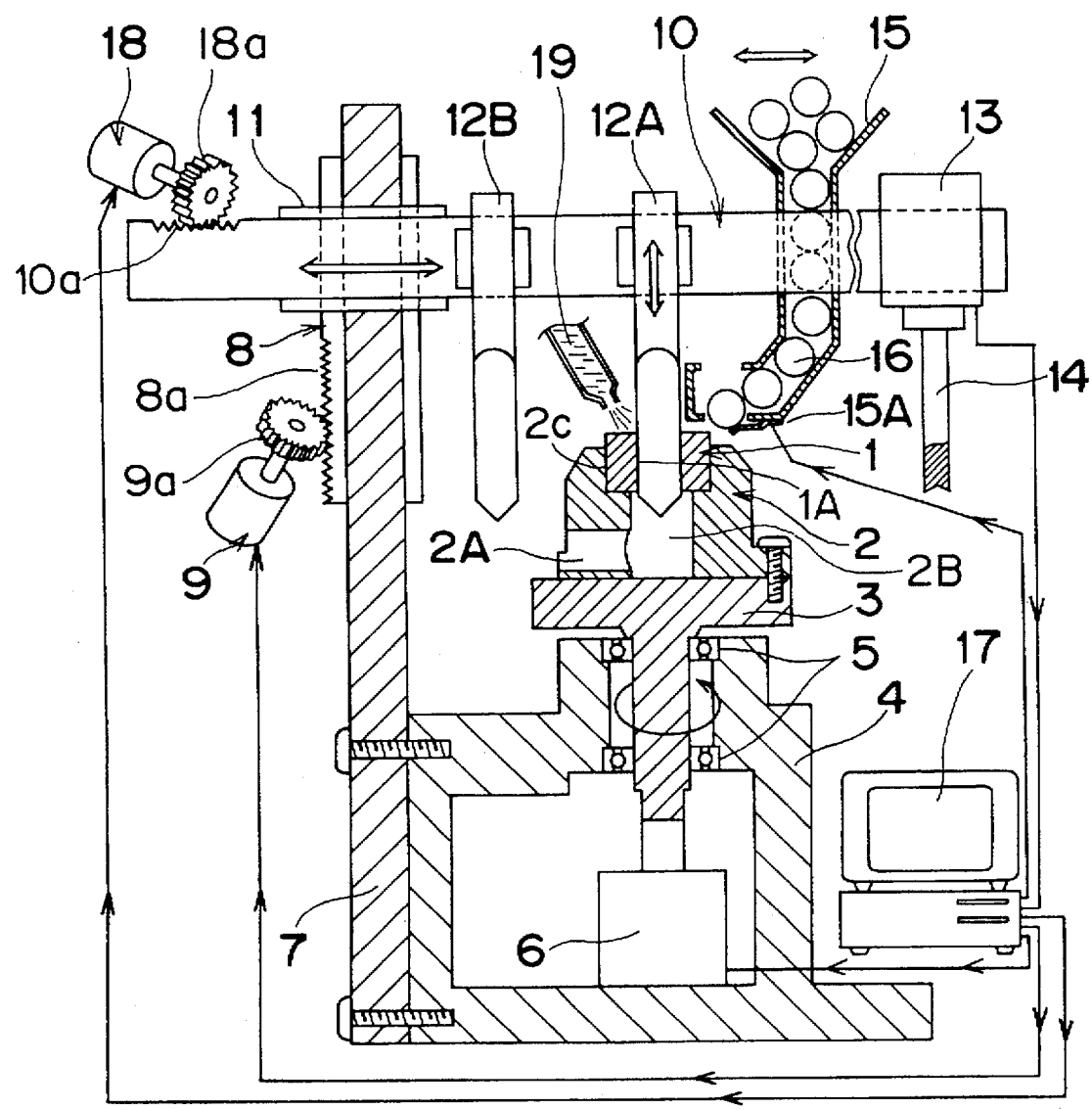
FIG. 1 is a partial sectional view of a sleeve bore machining apparatus according to a first embodiment of the present invention.

Before the description of the present invention proceeds, it is to be noted that like parts are designated by like reference numerals throughout the accompanying drawings.

Figure 2:
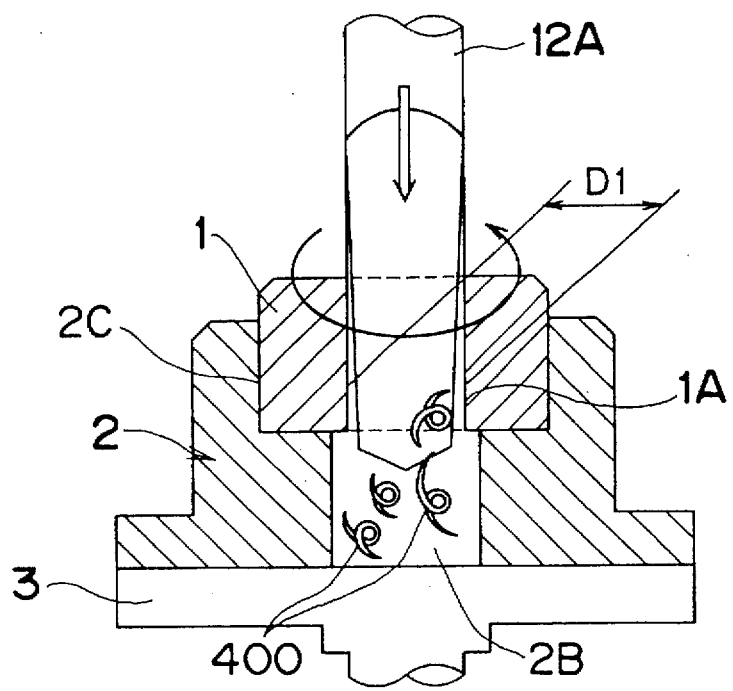
FIG. 2 is a partial sectional view showing the machining process of the machining apparatus according to the first embodiment of the present invention.
Figure 3:
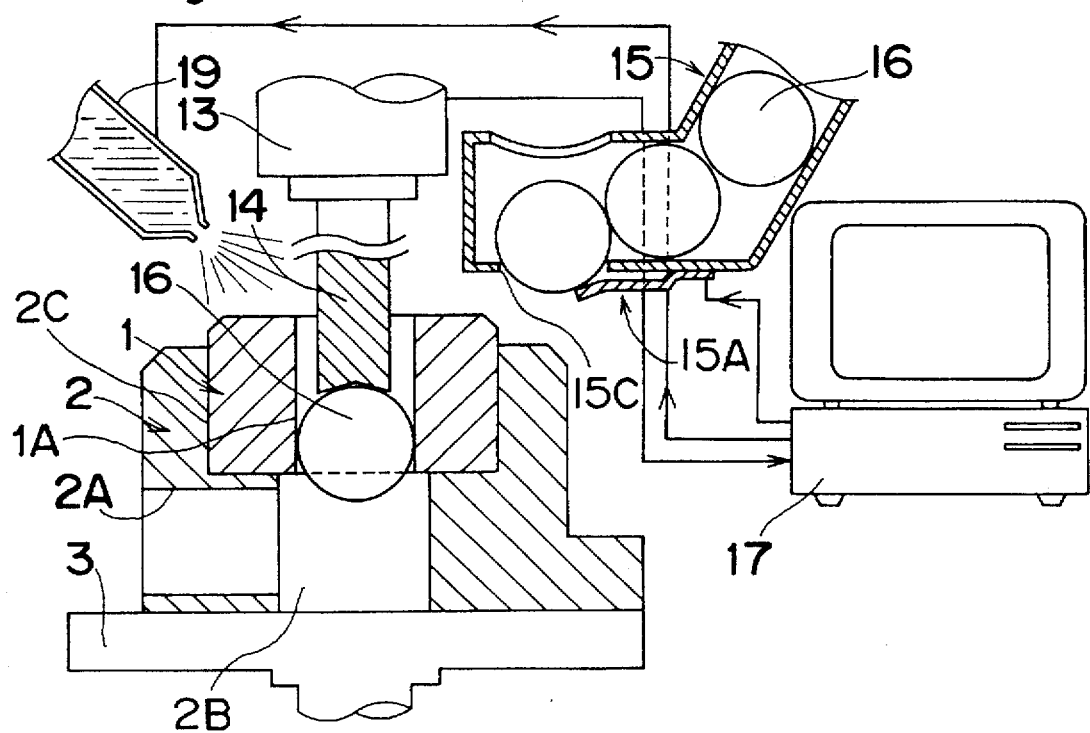
FIG. 3 is a partial sectional view of showing the bore inner diameter measuring process of the machining apparatus according to the first embodiment of the present invention.
Figure 21:
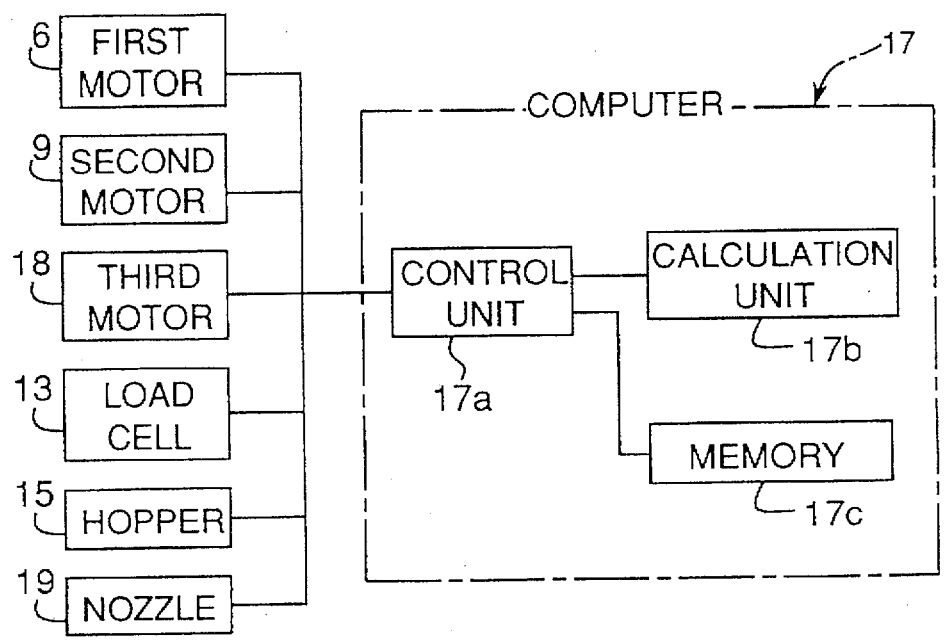
FIG. 21 is a view showing the construction of the computer of the apparatus in FIG. 1.

Hereinbelow, a sleeve bore machining apparatus and sleeve bore machining method according to one embodiment of the present invention is described with reference to FIGS. 1 to 7 and FIG. 21. FIG. 1 is a sectional view of the sleeve bore machining apparatus. A work spindle 3, which is rotatable by a first motor 6 and supported by bearings 5, is provided on a base 4, and a chuck 2 is fixed to the work spindle 3. The chuck 2 has a ball discharge hole 2A penetrated the cylindrical chuck 2 in its diameter direction and connected to its center hole 2A, and has a sleeve (workpiece) 1 fixed to its recess 2C at an upper portion of its center hole 2B, for holding the sleeve 1. A stage 10 is mounted to a stand 7 fixed to the side of the base 4 in such a way that the stage 10 is slidable vertically and laterally by slide members 8, 11. Reamers 12A, 12B having different diameters as well as a pusher 14 having a load cell 13 are fixed to the stage 10 with the reamers 12A and 12B and the pusher 14 positioned along the axis of the sleeve 1 fixed to the chuck 2. The vertical slide member 8 is attached to the stand 7 so as to be capable of sliding along the up-and-down direction in FIG. 1. A gear 9a of the second motor 9 is engaged with a rack 8a of the up-and-down slide member 8. Therefore, the normal and reverse rotations of the gear 9a of the second motor 9 engaging with the rack 8a of the up-and-down slide member 8 allows the up-and-down slide member 8 to move upward and downward with respect to the stand 7. The up-and-down slide member 8 supports at its upper portion the stage 10 so as to be capable of be slid laterally via the lateral slide member 11. A gear 18a of the third motor 18 is engaged with a rack 10a of the stage 10 at the end of the stage 10. Therefore, the normal and reverse rotations of the gear 18a of the second motor 18 engaging with the rack 10a of the stage 10 allows the stage 10 to move laterally with respect to the stand 7 via the lateral slide member 11 and the up-and-down slide member 8. Thus, by the drive of the second motor 9 and the third motor 18, the two reamers 12A and 12B and the pusher 14 are capable of moving in the up-and-down direction which is an axial direction of the sleeve 1 fixed to the chuck 2 and in the lateral direction which is a direction perpendicular to the axial direction. The lower end of the pusher 14 has a recessed circular cone shape to ensure that the ball 16 is surely pushed into the bore 1A of the sleeve 1 and passed through the bore 1A by the pusher 14. Designated by reference numeral 15 is a hopper having a stopper 15A, and the hopper 15 has stored balls 16 therein. As shown in FIG. 3, the stopper 15A opens and closes a lower hole 15C of the hopper 15 so that only one ball 16 can be supplies into the bore 1A of the sleeve 1. The hopper 15 is fixed to the stage 10 so that the stage 10 as well as the reamers 12A and 12B can move between an upper position above the sleeve 1 and a retrieval position away from the upper position by the second motor 9 and the third motor 18. The hopper 15 may be moved between the two positions by a driving member separated from the stage 10. Reference numeral 17 denotes a computer including a memory 17c, a calculation unit 17b, and a control unit 17a as shown in FIG. 21. Based on the measurement information from the load cell 13, relationship between the measurement information and a finished inner diameter of the bore 1A of the sleeve 1 stored in the memory 17c is calculated at the calculation unit 17b, and based on the calculated result, the control unit 17a controls the drives of the first motor 6, the second motor 9, the third motor 18, the stopper 15A of the hopper 15, a nozzle 19 for supplying oil mist. The nozzle 19 supplies oil mist to the sleeve 1 etc. at the sleeve machining process or ball inserting process so as to prevent the bore 1A of the sleeve 1 from being suffered any damage at the machining process or the bore inner diameter measurement process.

Figure 7:
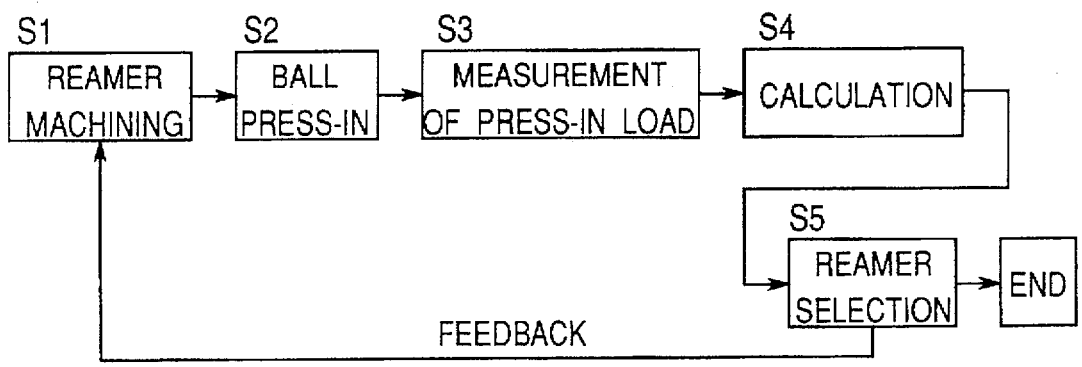
FIG. 7 is a process chart of a sleeve bore machining method according to the first embodiment of the present invention.

The operation of the sleeve bore machining apparatus and sleeve bore machining method with the above constitution is now explained with respect to FIG. 7. Referring to FIG. 1 and FIG. 2, the sleeve 2 is rotated by the drive of the first motor 6, while the reamer 12A is inserted to a certain position in the sleeve 1 by the drives of a second motor 9 and the third motor 18. Through this process, a bore 1A of the sleeve 1 is machined into a diameter D1 (step S1 in FIG. 7). In FIG. 2, reference numeral 400 denotes chips.

Figure 4:
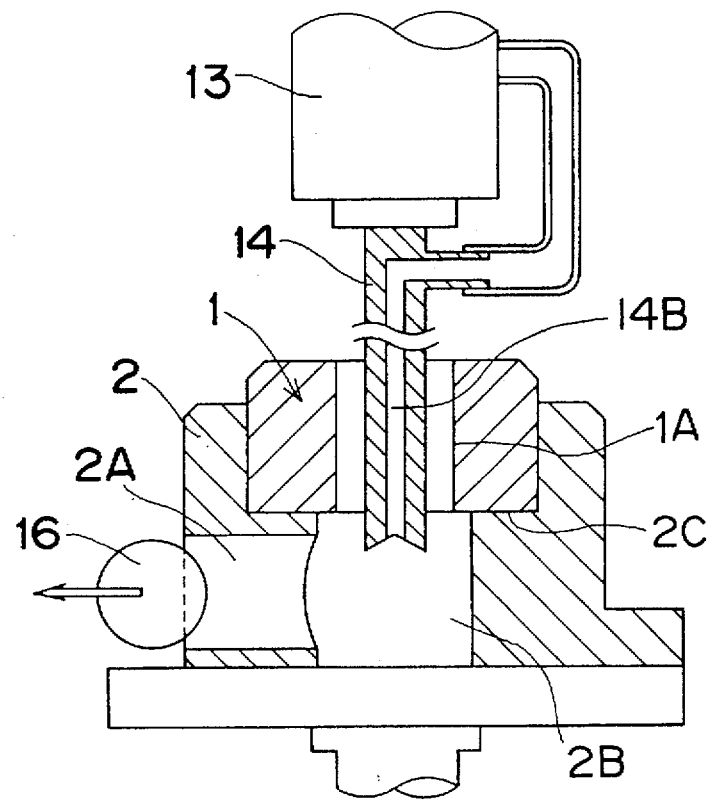
FIG. 4 is a partial sectional view of the ball discharge process of the machining apparatus according to the first embodiment of the present invention.

At step 2 in FIG. 7, referring to FIG. 1 and FIG. 3, the ball 16 fed from the hopper 15 is pressed into the bore 1A of the sleeve 1 to pass through the bore 1A to the center hole 2B of the chuck 2 by the pusher 14 (step S2), where the push-in load involved in this operation with respect to the bore 1A of the sleeve 1 is measured by the load cell 13 and inputted to the control unit 17a of the computer 17 (step S3 in FIG. 7). After the push-in load is measured as described above, referring to FIG. 4, the ball 16 that has been passed through the bore 1A is discharged out of the ball discharge hole 2A by pneumatic pressure or centrifugal force. That is, as shown in FIG. 4, compressed air from a compressed air supply hole 14A penetrated the pusher 14 is supplied into the bore 1A of the sleeve 1 to outwardly discharge the ball 16 in the bore 1A from a ball discharge hole 2A of the chuck 2 by the pressure of the compressed air through the center hole 2B of the chuck 2. Instead of the usage of the compressed air, the chuck 2 merely rotates to discharge the ball 16 from the ball discharge hole 2A of the chuck 2 by the centrifugal force caused by the rotation of the chuck 2.

In the meantime, the calculation unit 17b of the computer 17 decides whether based on the detected load information inputted from the load cell 13 into the control unit 17a and the finished inner diameter of the reamer-machined bore 1A of the sleeve 1 stored in the memory 17c in the computer 17, the diameter D1 of the bore 1A of the sleeve 1 complies with the specification, i.e. the finished inner diameter or is too large or too small, and then, determines which is better to use as the reamer for the next sleeve machining process, the thinner reamer 12A or the thicker reamer 12B (step S4 in FIG. 7).

Figure 5:
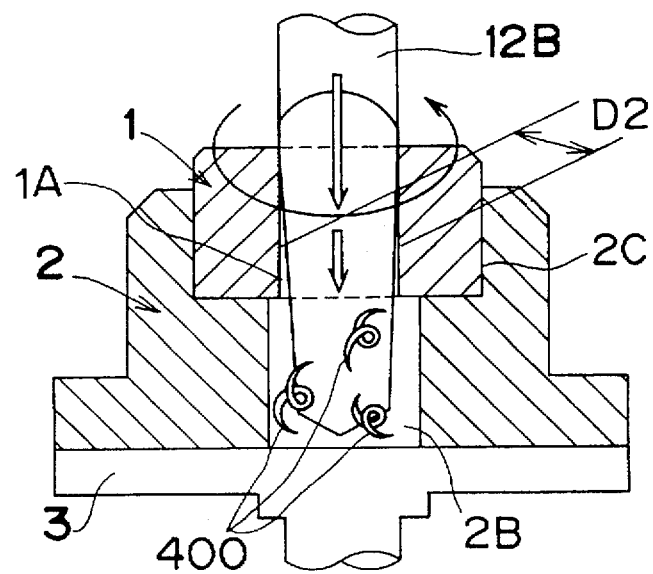
FIG. 5 is a partial sectional view of the machining apparatus according to the first embodiment of the present invention.

If the computer 17 has been decided that the inner diameter of the bore 1A of the sleeve 1 is too small, another sleeve to be next machined is machined by the thicker reamer 12B into a bore diameter D2, as shown in FIG. 5 (step S5 in FIG. 7). As a result, the bore 1A of the sleeve 1 is next machined is machined by the thicker reamer 12B into the bore diameter D2. This diameter of the bore 1A is measured similarly as shown in FIG. 3, i.e. in the same manner at step S3 and the reamer 12A or 12B, whichever it is used as required, is selected.

Figure 6:
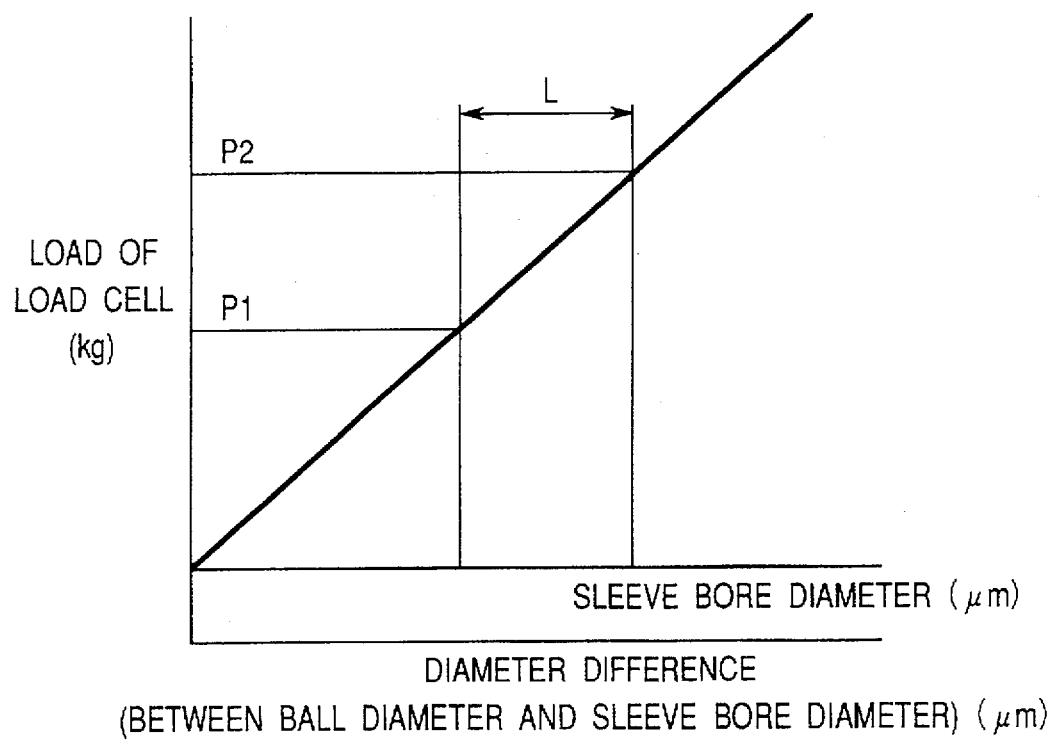
FIG. 6 is a view showing the relationship between load detected by the load cell and finished inner diameter of sleeve bore in the machining apparatus according to the first embodiment of the present invention.

FIG. 6 is a graph showing the relationship between the detected load of the load cell 12 and the diameter difference (between ball diameter and sleeve diameter). If the detected load falls inside the range of P1 to P2, it means that the sleeve bore diameter is within the tolerance. If the detected load is over P2, the bore diameter D1 is too small, in which case the control unit 17a of the computer 17 issues such a signal to the third motor 18 that the thicker reamer 12B will be used for the next machining process. As a result, the stage 10 moves and the reamer 12A is exchanged for the reamer 12B to be used.

FIG. 7 is a process chart of the sleeve bore machining method according to the first embodiment of the present invention. In this machining method, as described with FIGS. 1 through 6, the machining and the bore diameter check are carried out according to the order of this process chart.

It is preferable that the diameter of the ball 16 is the same as or larger than the finished inner diameter of the bore 1A of the sleeve 1 by about several micron meters. For example, when the finished inner diameter of the bore of the sleeve is 3 mm, the diameter of the ball is 3 mm+3 μm. At that time, the load cell 13 detects 1.5 kg load to be decided that the suitable finished diameter is obtained.

As seen above, according to the present first embodiment, the reamer 12A or 12B, whichever it is more suited out of a plurality of reamers with different diameters, is selected for the machining process. Therefore, the finished inner diameter of the bore 1A of the sleeve 1 has high accuracy.

FIGS. 8 through 15 show a sleeve bore machining apparatus and method according to a second embodiment of the present invention. The two kinds of reamers 12A and 12B with different diameters are used to obtain the two kinds of the inner diameters of the bores 1A of the sleeves 1 in the first embodiment. Alternatively, in the second embodiment, as described below, only one reamer 12C is used to obtain the same effect as the first embodiment.

Figure 8:
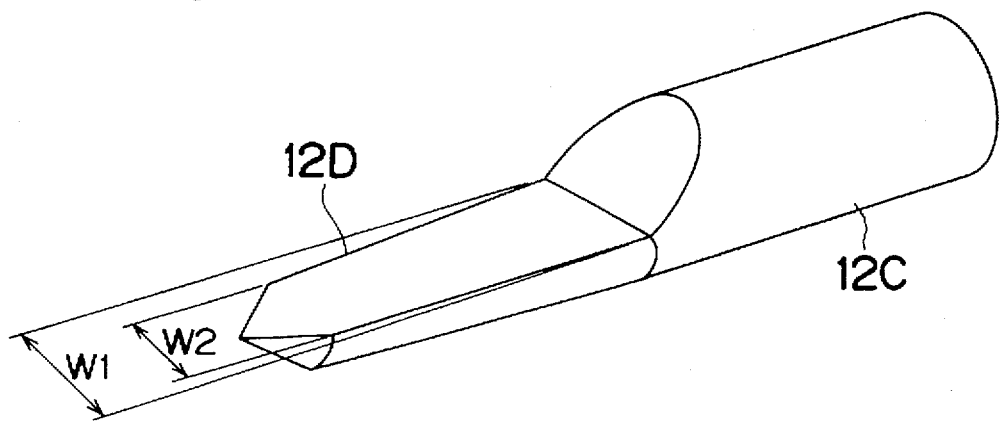
FIG. 8 is a perspective view of a taper reamer of a sleeve bore machining apparatus according to a second embodiment of the present invention.
Figure 9:
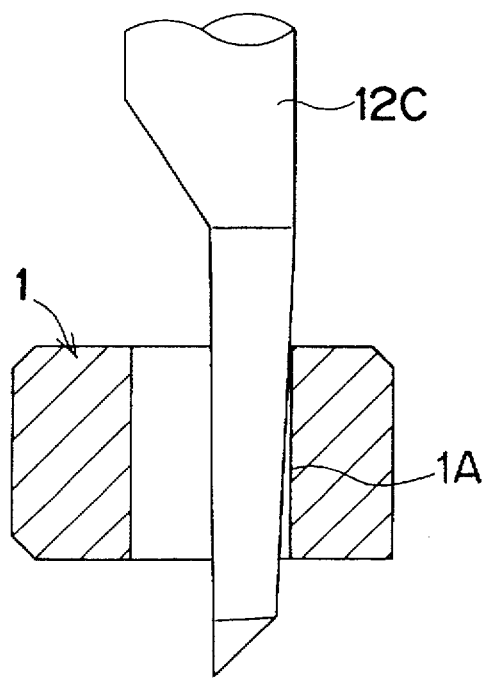
FIG. 9 is a partial sectional view showing the relationship between the taper reamer and the sleeve bore to explain the tape reamer in FIG. 8.
Figure 10:
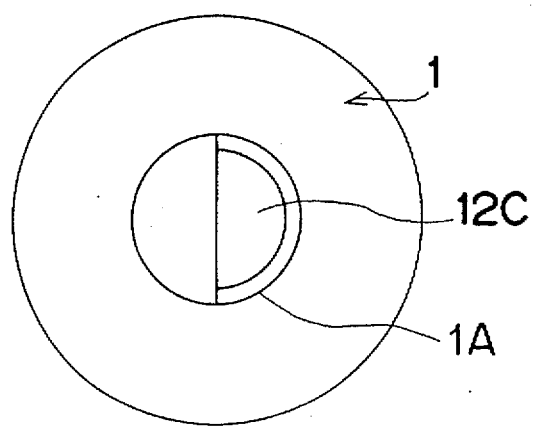
FIG. 10 is a plan view showing the relationship between the taper reamer and the sleeve bore to explain the taper reamer in FIG. 8.
Figure 11:
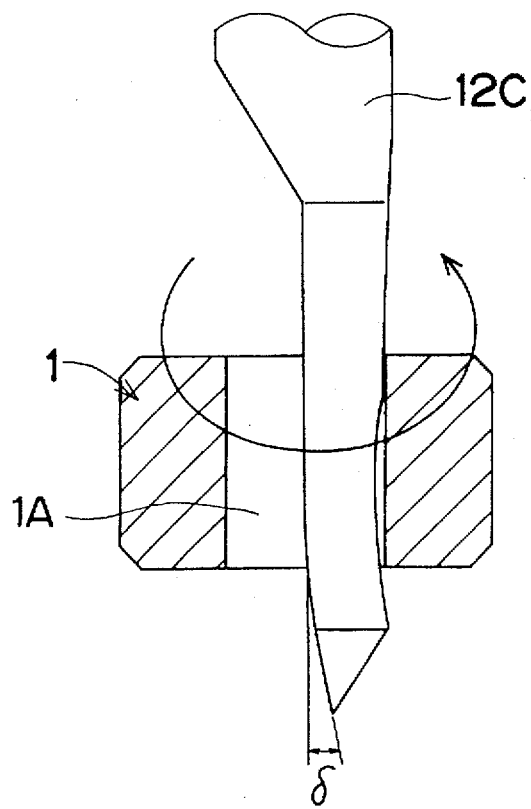
FIG. 11 is a partial view of the sleeve bore machining process by the taper reamer of FIG. 8.
Figure 12:
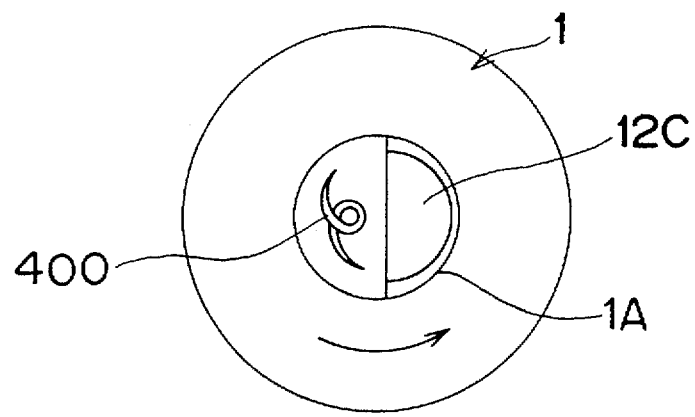
FIG. 12 is a view showing the relationship between the taper reamer in FIG. 11 and the sleeve bore.
Figure 13:
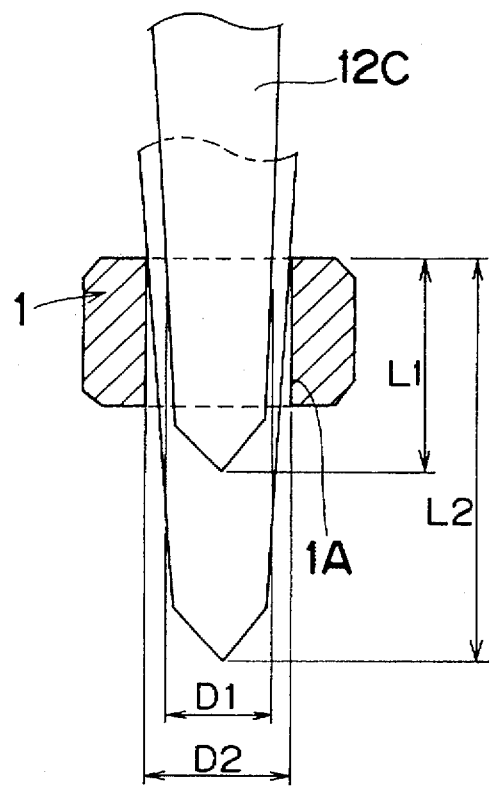
FIG. 13 is a view showing the relationship between the taper reamer according to the second embodiment of the present invention and the sleeve bore.
Figure 14:
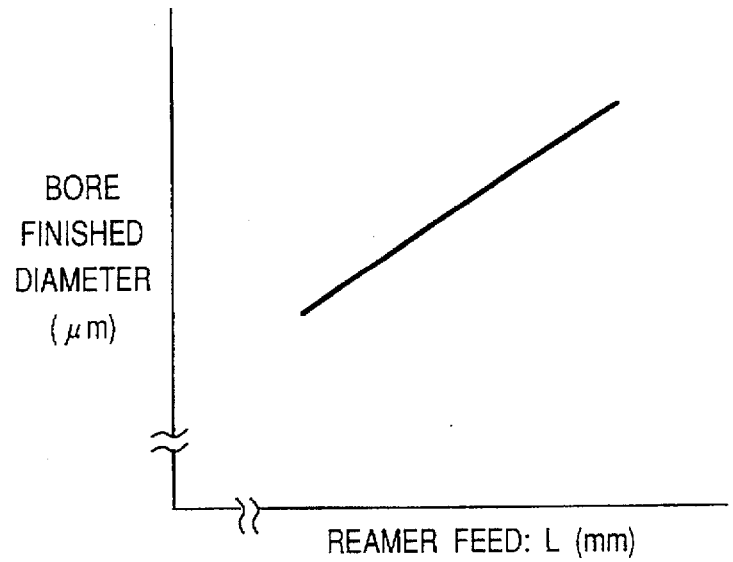
FIG. 14 is a view showing the relationship between the finished inner diameter of the sleeve bore and the feeding amount of the reamer in the method according to the second embodiment of the present invention.

FIG. 8 depicts the reamer 12C having an edged taper to be used in the second embodiment. This taper is approximately 0.3% to 3% in diameter. FIGS. 9 and 10 show a state in which the reamer 12C is inserted in the bore 1A of the sleeve 1. FIGS. 11 to 12 are views under grinding process, where the bore 1A is machined by the reamer 12C while causing a certain extent of flexure δ around 0.15% to 1.5% due to machining resistance. This extent of flexure δ and the edged taper of the reamer 12C are offset by each other, so that the cylindricity of the bore 1A of the sleeve 1 is finished to a high accuracy of around 1 μm or less. Further, referring to FIG. 13, by adjusting the feed of the reamer 12C into the bore 1A of the sleeve 1 to L1 to L2, the finished inner diameter of the bore 1A can be changed to D1 to D2. FIG. 14 is an example showing the relationship between the feeding amount of the reamer 12C and the finished inner diameter of the sleeve bore 1A when an about 4 mm-diameter bore is machined.

Figure 15:
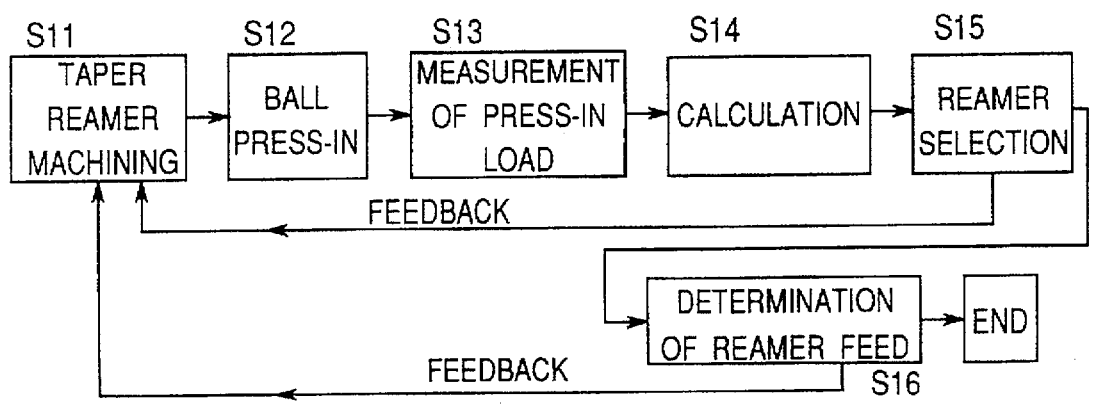
FIG. 15 is a process chart of the method according to the second embodiment of the present invent ion.

FIG. 15 is a process chart of the second embodiment as described with FIGS. 8 through 14. The steps S11 through S15 are the same processes at the steps S1 through S5 in the first embodiment. The process at step S15 is to select a reamer from the a plurality of reamers 12C when the plurality of reamers 12C are provided at the apparatus or select a reamer from the reamers 12A and 12B in the first embodiment and the reamer 12C in the second embodiment when such reamers 12A, 12B, and 12C are provided at the apparatus. That is, when only one reamer 12C is provided at the apparatus, it is unnecessary to carry out the process at step S15. A process at step S16 is to decide the feeding amount of the reamer 12C by the calculation unit 17b of the computer 17 when the inner diameter of the bore 1A is changed, as described above. In the process at step S16, based on the inner diameter information of the bore 1A of the sleeve 1 measured by the load cell 13, the finished inner diameter information, and the relationship information between the feeding amount of the reamer 12C and the finished inner diameter of the bore 1A, the calculation unit 17b of the computer 17 decides the feeding amount of the reamer 12C. For example, after the reamer 12C processes the bore 1A of the sleeve 1 by a certain feeding amount of the reamer 12C, the ball 16 is inserted into the processed bore 1A to measure the inner diameter of the processed bore 1A by the load cell 13 and then, the inner diameter is smaller than the finished inner diameter. At that time, the bore 1A is re-processed by the reamer 12C by enough an additional feeding amount to obtain the finished inner diameter and such feed-back control is carried out that the feeding amount of the reamer 12C is increased in the next process. If the measured inner diameter of the bore 1A is larger than the finished inner diameter, such feed-back control is carried out that the feeding amount of the reamer 12C is decreased in the next process.

As seen above, according to the second embodiment of the present invention, the sleeve can be finished to a bore 1A of the sleeve 1 of high accuracy, while its cylindricity is also of high accuracy, as in the first embodiment.

The reamer 12C of FIG. 8 may also be a generally stepped reamer having a plurality of tapered grinding portions or a generally tapered reamer having stepped portions, without being limited to the above edged taper.

It is possible that the reamers 12A, 12B of FIG. 1 each have a taper portion 12D similar to that of FIG. 8, where the computer 17 selects one out of a plurality of reamers and determines the feeding amount of the reamer.

It has been described in FIG. 1 that the load cell 13 and the pusher 14 are fitted to the stage 10. However, the case is the same also when these members are provided separately.

Figure 16:
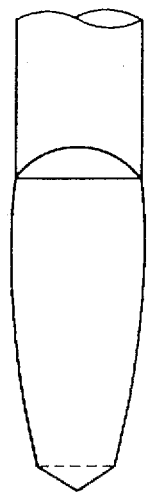
FIG. 16 is a perspective view of a reamer according to another embodiment of the present invention.

The configuration of the reamer is not limited to the above configuration but may be of a generally taper-shape shown in FIG. 16, as one example.

Figure 17:
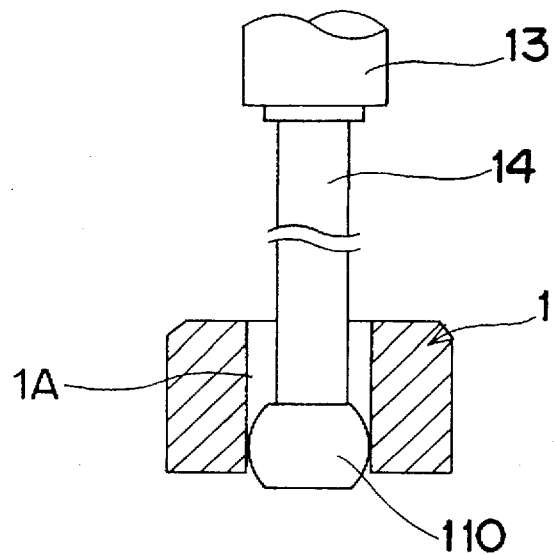
FIG. 17 is a partial sectional view showing the relationship between the pusher and the sleeve bore according to a still another embodiment of the present invention.

The present invention is not limited to that only one ball 16 which is separated from the pusher 14 is inserted into the bore 1A by the pusher 14 to measure the inner diameter of the bore 1A, but may be applied to that as shown in FIG. 17, a measurement element 110 having a spherical side surface is fixed to a lower end of the pusher 14 and the measurement element 110 is inserted into the bore 1A to measure the inner diameter of the bore 1A.

Figure 18:
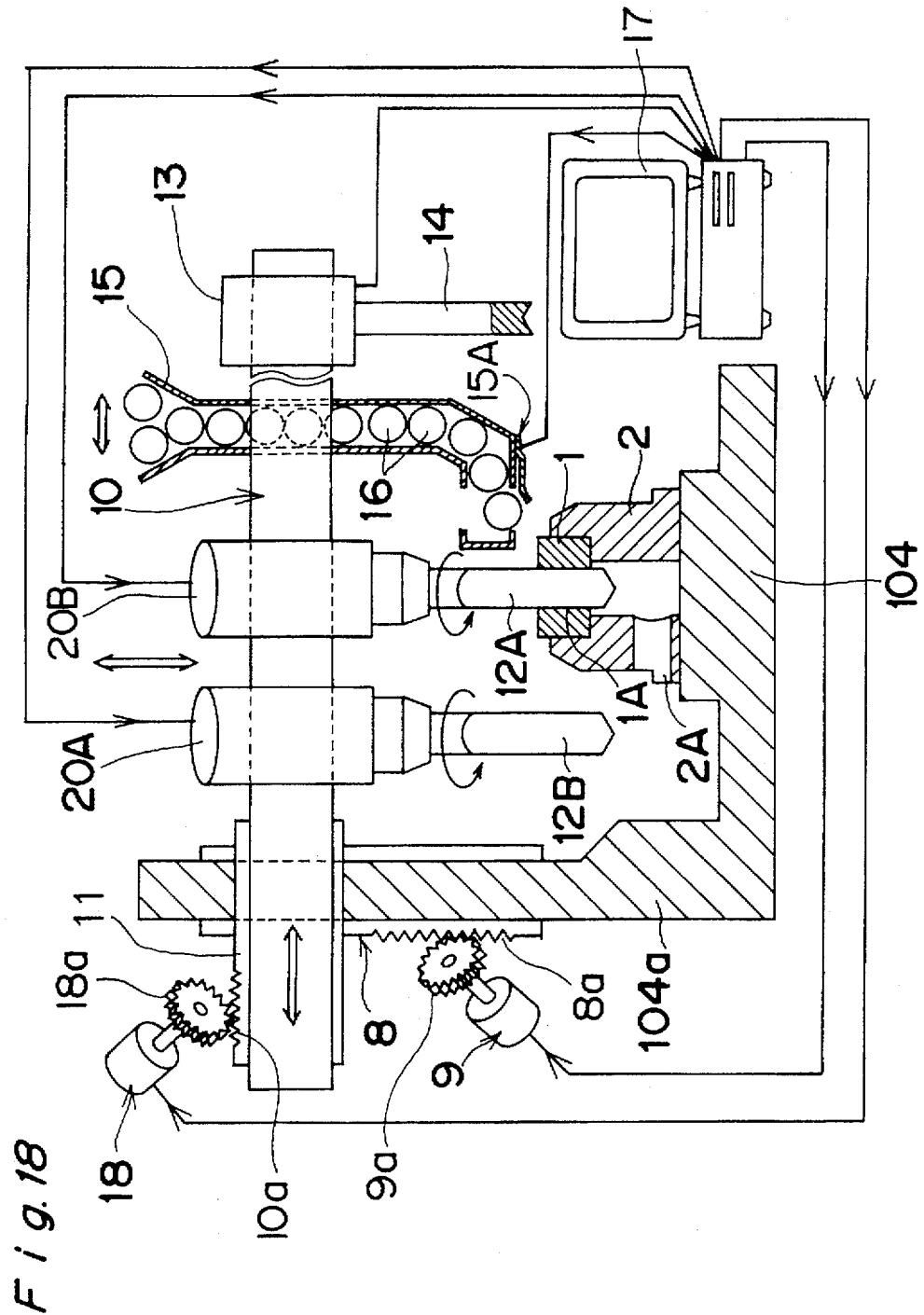
FIG. 18 is a partial sectional view of a sleeve bore machining apparatus according to a further embodiment of the present invention.
Figure 19:
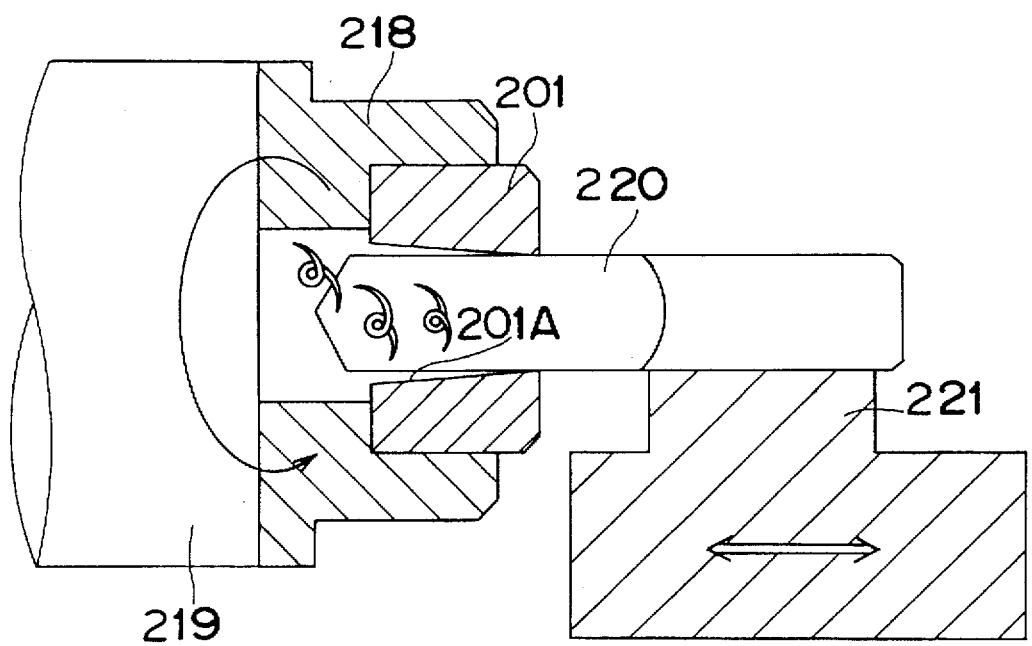
FIG. 19 is a sectional view of a sleeve bore machining apparatus according to the prior art.
Figure 20:
FIG. 20 is a process chart of a sleeve bore machining method according to the prior art.

The present invention is not limited to that the chuck 2 where the sleeve 1 is fixed to the chuck 2 is rotated with the reamers 12A and 12B or 12C fixed, but may be applied to that as shown in FIG. 18, while the sleeve 1 fixed to the chuck 2 fixed to a base 104, the reamer 12A or 12B is rotated by a motor 20A or 20B to obtain the same effect as the embodiment. Although the two reamers 12A and 12B are respectively rotated by the motors 20A and 20B in FIG. 18, the reamer 12C in the second embodiment may be rotated by the motor 20A or 20B by replacing the reamer 12A or 12B with the reamer 12C in FIG. 18. In FIG. 18, the base 4 and the stand 7 in FIG. 1 respectively correspond to the base 104 and a stand 104a fixed to the stand 104.

Figure 22:
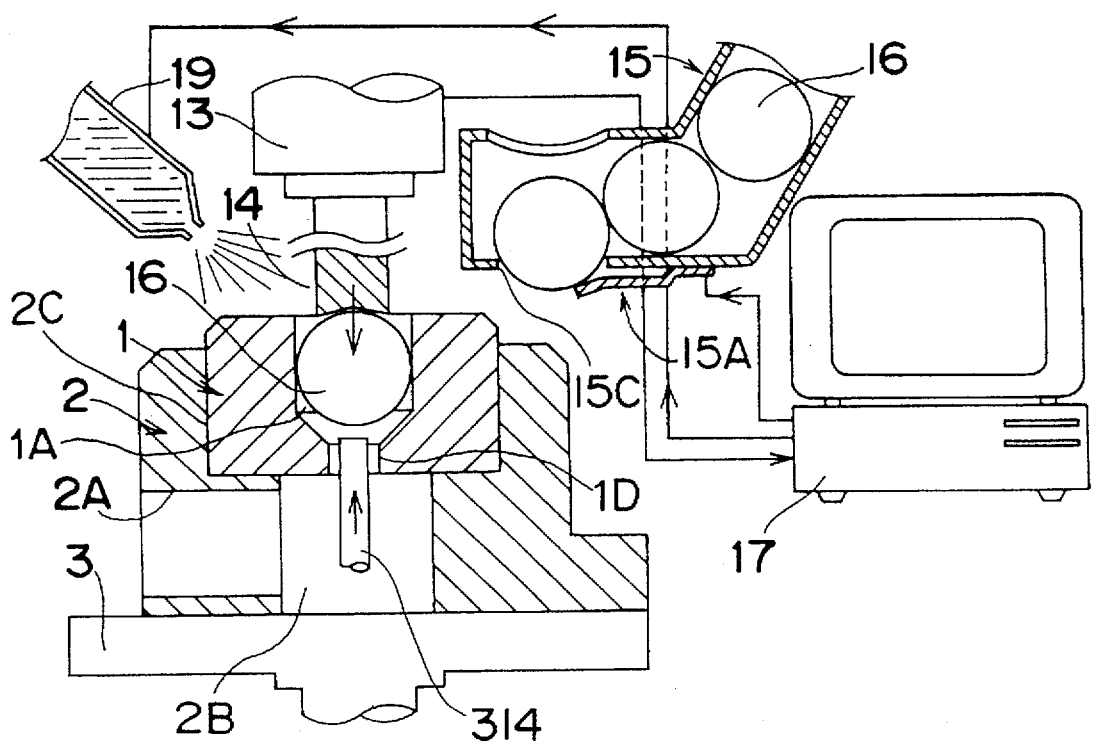
FIG. 22 is a partial sectional view of showing the bore inner diameter measuring process of a sleeve bore machining apparatus according to a further embodiment of the present invention.

The present invention is not limited to the above embodiments where the measurement element such as the ball 16 is passed through the bore 1A of the sleeve 1, but can be applied to an embodiment where the element is not passed through the bore 1A. For example, FIG. 22 is a partial sectional view of showing the bore inner diameter measuring process of a sleeve bore machining apparatus according to a further embodiment of the present invention. In this embodiment, the sleeve 1 has the bore 1A and a small hole 1C having the smaller than the inner diameter of the bore 1A and the diameter of the ball 16. Thus, the ball 16 can not be passed through the small hole 1C. Therefore, after the ball 16 is inserted into the bore 1A of the sleeve 1 by the pusher 14 to measure the inner diameter of the bore 1A, an eject pin 314 is inserted into the small hole 1C of the sleeve 1 to push the ball 16 in the bore 1A and to discharge the ball 16 from the inside of the sleeve 1.

As described above, according to the present invention, a reamer to be used for the machining of the bore of the sleeve can be automatically selected from among a plurality of reamers, or the feeding amount of the reamer having an edged taper in the machining process can be automatically determined, so that the dimensional accuracy of the bore as well as the cylindricity can be successfully machined.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A sleeve bore machining method comprising steps of:
   relatively rotating a sleeve which is to be machined and one of a plurality of reamers to machine a bore of the sleeve;
   after machining the bore, supplying a measurement element for measuring an inner diameter of the bore into the bore of the sleeve under pressure;
   measuring a push-in load caused by the measurement element at the measurement element supplying step; and
   selecting a reamer to be used, from among the plurality of reamers, in response to a magnitude of the push-in load.

2. The method as claimed in claim 1, wherein the plurality of reamers each have, as part of edge surface thereof, an edged taper shape or a generally taper shape, and
   in the selecting step, in response to the magnitude of the push-in load, a reamer to be used is selected from among the plurality of reamers and an extent of pushing of the selected reamer into the sleeve is determined.

3. The method as claimed in claim 2, wherein a diameter of the measurement element is equal to or larger than a finished inner diameter of the bore of the sleeve.

4. The method as claimed in claim 1, wherein a diameter of the measurement element is equal to or larger than a finished inner diameter of the bore of the sleeve.

5. The method as claimed in claim 1, wherein a diameter of the measurement element is larger than a finished inner diameter of the bore of the sleeve by several micrometers.

6. A sleeve bore machining method comprising steps of:
   relatively rotating a sleeve which is to be machined and one of a plurality of reamers having an edged taper shape or a generally taper shape to machine a bore of the sleeve;
   after machining the bore, supplying a measurement element for measuring an inner diameter of the bore into the bore of the sleeve under pressure;
   measuring a push-in load caused by the measurement element at the measurement element supplying step; and
   determining an extent of pushing of the one of the plurality of reamers into the sleeve, in response to a magnitude of the push-in load.

7. The method as claimed in claim 6, wherein a diameter of the measurement element is equal to or larger than a finished inner diameter of the bore of the sleeve.

8. The method as claimed in claim 6, wherein a diameter of the measurement element is larger than a finished inner diameter of the bore of the sleeve by several micron meters.

* * * * *